(12) United States Patent
White et al.

(10) Patent No.: US 7,669,553 B2
(45) Date of Patent: Mar. 2, 2010

(54) BIRD FEEDING SYSTEM

(76) Inventors: Travis White, 1718 E. Ridgeview Cir., Layton, UT (US) 84040; Ann Pritt, 690 E. Center St., Kaysville, UT (US) 84037

( * ) Notice: Subject to any disclaimer, the term of this patent is extended or adjusted under 35 U.S.C. 154(b) by 0 days.

(21) Appl. No.: 11/374,537

(22) Filed: Mar. 13, 2006

(65) Prior Publication Data
US 2007/0006812 A1    Jan. 11, 2007

Related U.S. Application Data

(60) Provisional application No. 60/660,862, filed on Mar. 11, 2005.

(51) Int. Cl.
  *A01K 39/00* (2006.01)
(52) U.S. Cl. ................. 119/57.8; 119/450
(58) Field of Classification Search ........... 119/52.2, 119/57.8, 428–435, 459–471; D30/124, D30/125–128
See application file for complete search history.

(56) References Cited

U.S. PATENT DOCUMENTS

| | | | | |
|---|---|---|---|---|
| 341,540 A * | 5/1886 | Armstrong | ......... | 119/469 |
| 363,879 A * | 5/1887 | Armstrong | ......... | 119/469 |
| 429,196 A * | 6/1890 | Leonard | ........... | 119/469 |
| 1,094,423 A * | 4/1914 | Brandt | .............. | 119/469 |
| 2,002,925 A * | 5/1935 | Robison | ........... | 119/470 |
| 2,028,612 A * | 1/1936 | Kosvich | ........... | 119/469 |
| 2,045,472 A * | 6/1936 | Kearney et al. | ..... | 119/469 |
| 2,891,508 A * | 6/1959 | Bower | ............... | 119/52.3 |
| D289,211 S * | 4/1987 | Riha | ................ | D30/125 |
| 5,040,491 A * | 8/1991 | Yancy | ............... | 119/57.8 |
| 5,088,445 A * | 2/1992 | Brindamour | ....... | 119/469 |
| 5,215,040 A * | 6/1993 | Lemley | ............. | 119/57.9 |
| 5,711,247 A * | 1/1998 | Henshaw | ........... | 119/57.8 |
| 5,758,596 A * | 6/1998 | Loiselle | ............. | 119/52.2 |
| 5,988,111 A * | 11/1999 | Kujath | .............. | 119/469 |
| 6,145,477 A * | 11/2000 | Jansen | .............. | 119/416 |
| D448,125 S * | 9/2001 | Ranly | ............... | D30/121 |
| 6,390,021 B1* | 5/2002 | Krenzel | ............. | 119/52.2 |
| 6,564,745 B1* | 5/2003 | Bloedorn | ........... | 119/57.8 |
| 6,640,745 B1* | 11/2003 | Park | .................. | 119/52.2 |
| 6,662,747 B1* | 12/2003 | Wydra | .............. | 119/63 |
| D509,326 S * | 9/2005 | Clark | ................ | D30/128 |
| 7,373,901 B2* | 5/2008 | Baynard | ............ | 119/57.9 |
| 7,409,922 B1* | 8/2008 | Baynard et al. | .... | 119/52.3 |
| D577,159 S * | 9/2008 | Hasapoglou | ....... | D30/128 |
| 2005/0145182 A1* | 7/2005 | Marshall | ............ | 119/57.8 |
| 2005/0178338 A1* | 8/2005 | Smith | ............... | 119/57.8 |

OTHER PUBLICATIONS

Planar definition [http://www.merriam-webster.com/dictionary/planar; retrieved from internet: Jan. 29, 2009].*

* cited by examiner

*Primary Examiner*—Rob Swiatek
*Assistant Examiner*—Kristen C Hayes
(74) *Attorney, Agent, or Firm*—Workman Nydegger

(57) ABSTRACT

A bird feeding system may include a platform that is sized and configured to catch at least a portion of the bird feed that may fall from a bird feeder. The platform may include a frame and a catching portion, which may have a permeable construction. The frame may be configured to be moved between a collapsed position for storage and an expanded position for use. Advantageously, the platform may be connected to different types and configurations of bird feeders and/or other structures using attachment members that are adjustable in length.

23 Claims, 2 Drawing Sheets

BIRD FEEDING SYSTEM

CROSS-REFERENCE TO RELATED APPLICATIONS

This applications claims priority to and the benefit of U.S. provisional patent application Ser. No. 60/660,862, filed Mar. 11, 2005 and entitled BIRD FEEDING SYSTEM, the disclosure of which is incorporated by reference.

BACKGROUND OF THE INVENTION

1. Field of the Invention

The present invention relates to systems for feeding one or more animals, and, in particular, to a system for feeding birds.

2. Description of Related Art

Bird feeders are known in the art. Conventional bird feeders include a container for bird feed and are typically used to attract wild birds. To use these conventional bird feeders, a person places bird feed within the bird feeder's container and typically places the bird feeder outdoors. The person then may watch birds eat the bird feed from the bird feeder.

As the birds eat, a substantial amount of the bird feed may fall to the ground. For example, perch feeding birds (such as buntings, bluebirds, finches, and chickadees) prefer to eat when perched at the bird feeder, but they can inadvertently drop some of the bird feed while eating at a conventional bird feeder. Further, ground feeding birds (such as native sparrows, house sparrows, and juncos) prefer eating bird feed off the ground and thus will deliberately cast the bird feed from the bird feeder onto the ground for eating.

While the birds may eat some of the fallen bird feed, much of the fallen bird feed often remains uneaten, causing several problems. For example, the uneaten fallen bird seed can attract rats, mice or other vermin that may be destructive, annoying and even cause health problems.

The uneaten fallen bird feed can also damage lawns. For example, some bird feed may include certain seeds that can grow to become weeds. In addition, the fallen bird feed can accumulate in piles, which can prevent sunlight from reaching portions of the lawn and thus damage the grass. Further, when animals attempt to eat the bird seed on the ground, they may damage the turf. Accordingly, to protect one's lawn, one may be required to spend a significant amount of time cleaning up the fallen bird feed.

In addition to wasting time, conventional bird feeders may waste money. For example, rain or other conditions can rot the fallen bird feed—making the fallen bird feed unusable for refilling the bird feeder. Accordingly, users must purchase more bird seed to refill their bird feeders. Further, even if some of the fallen bird feed is not rotten, retrieving the usable bird feed can be tedious, difficult, and inefficient.

BRIEF SUMMARY OF EMBODIMENTS OF THE INVENTION

A need exists for a bird feeding system that eliminates or reduces the disadvantages and problems described above.

One aspect is a bird feeding system that may include a bird feeder. The bird feeder preferably includes a container into which bird feed may be added. The bird feed may comprise seeds, dried food or other food used to feed birds.

Another aspect is a bird feeding system that may include a bird feeder and a platform that is preferably sized and configured to catch at least a portion of the bird feed that may fall from the bird feeder. For example, at least a portion of the platform is preferably disposed below the bird feeder. As birds intentionally cast bird feed from the bird feeder and/or inadvertently drop bird feed from the bird feeder, the platform advantageously catches at least a portion of that fallen bird feed.

Yet another aspect is a bird feeding system that may include a bird feeder and a platform that is preferably sized and configured to feed the birds with bird feed that falls from the bird feeder. The platform may catch at least a portion of the bird feed as birds intentionally cast bird feed from the bird feeder and/or inadvertently drop bird feed from the bird feeder. Although ground feeding birds may find the bird feed undesirable when in the bird feeder, the ground feeding birds may find the fallen bird feed desirable when it is on the platform.

Still another aspect is a bird feeding system that is sized and configured to be used in connection with various types of bird feeders. For example, the bird feeding system may include a platform that catches at least a portion of the bird feed that may fall from the various types of bird feeders. In greater detail, the platform may be used with a hanging bird feeder. The platform may also include an opening that is sized and configured to receive a support member of a bird feeder. The platform may also be used independently of a bird feeder, which may serve as a platform feeder without an additional feeder for perching birds.

A further aspect is a bird feeding system that may include a bird feeder that has a perch. Perch feeding birds may advantageously use the perch to access the bird feed from the bird feeder. The bird feeding system may also include a platform that is preferably sized and configured to catch bird feed that may fall from the bird feeder. As the perch feeding birds inadvertently drop bird feed from the bird feeder and as ground feeding birds cast the bird feed from the bird feeder, the platform advantageously catches at least a portion of that fallen bird feed. Accordingly, the ground feeding birds may feed at the platform, while the perch feeding birds feed at the perch. Also, if desired, one may retrieve the uneaten fallen bird seed from the platform to refill the bird feeder for the perch feeding birds.

Another aspect is a bird feeding system that may include a platform that has a catching portion sized and configured to catch at least a portion of the bird feed that may fall from a bird feeder. The catching portion preferably has a permeable construction to allow water, rain, melted snow, and the like to pass through. Advantageously, because the catching portion may have a permeable construction, the catching portion preferably will not retain large amounts of rain, which could weigh upon and damage the platform. Further, if connected to a bird feeder, the catching portion having a permeable construction will help prevent the rain from significantly weighing down and damaging the bird feeder.

A further aspect is a bird feeding system that may include a platform that has a catching portion that is generally UV resistant. The generally UV resistant catching portion may, for example, be constructed from a UV resistant material. The generally UV resistant catching portion may have a UV protective product applied to at least a portion of the catching portion.

Still another aspect is a bird feeding system that may include a bird feeder and a relatively lightweight platform sized and configured to catch at least a portion of the bird feed that may fall from the bird feeder. When connected to the bird feeder, the lightweight platform may advantageously apply less stress upon the bird feeder, which may help avoid damage to the bird feeder. Further, when connected to a hanging bird feeder, the lightweight platform may advantageously apply less stress upon the structure from which the bird feeder hangs. For example, some bird feeders hang from a tree limb, which may be more susceptible to additional weight.

Yet another aspect is a bird feeding system that may include a platform with a frame and a catching portion. The frame is preferably sized and configured to support at least a portion of a catching portion. The frame preferably has a generally ring-like shape, and the frame may be connected to the catching portion to help support the catching portion.

Another aspect is a bird feeding system that may include a platform that is sized and configured to be moved between an expanded use position and a collapsed storage position. For example, the platform may include a catching portion and a frame, and the frame is preferably constructed from a flexible, collapsible material, such as lightweight tempered steel. The frame may advantageously be collapsed and expanded to permit the platform to be moved between an expanded use position and a collapsed storage position. A storage case may be provided to retain the platform in the collapsed storage position and to store any other suitable portions of the bird feeding system.

Yet another aspect is a bird feeding system that may include a platform, with a catching portion and a frame, and the frame and the platform may be twist-folded to collapse the frame and the platform. To help twist-fold the frame and the platform, the platform may include a sleeve into which some or all of the frame may be inserted and retained. The frame and the platform may be twist-folded to collapse to about 20 percent to about 30 percent of their expanded sizes. The frame and the platform preferably may be twist-folded to at least about 25 percent of their expanded sizes.

Still another aspect is a bird feeding system that may include a platform sized and configured to catch at least a portion of the bird feed that may fall from a bird feeder, and the platform is preferably positioned at least a substantial portion above the ground. Advantageously, because the platform is positioned at least a substantial portion above the ground, predators are less likely to be able to harm birds that feed from the platform rather than from the ground. Further, because the platform is positioned at least a substantial portion above the ground, persons may more easily view the birds that feed from the platform.

Still another aspect is a bird feeding system that may include a platform with a catching portion connected to a frame. The catching portion may be sewed upon the frame, but the catching portion may be connected to the frame in any other suitable fashion.

Yet another aspect is a bird feeding system that may include a platform that is connected to a bird feeder by a plurality of attachment members constructed from a relatively rigid material. The plurality of relatively rigid attachment members preferably are wires constructed from a generally rust resistant material. The relatively rigid attachment members may include a first end connected to the frame and a second end including a hook used to connect to a bird feeder. The first end of the attachment member may be connected to the frame by wrapping at least a portion of the attachment member around the frame or by other suitable means.

Yet another aspect is a bird feeding system that may include a platform that is quickly and easily connected to a variety of bird feeders. A plurality of attachment members may be used to connect the platform to the bird feeder. For example, the attachment members preferably comprise a cord, a first fastener, and a second fastener. The cord is preferably constructed of nylon or other suitable weather resistant materials. The first fastener preferably comprises a hook member constructed of metal and is sized and configured to be connected to a portion of the bird feeder. The second fastener preferably comprises a hook member constructed of plastic and is sized and configured to be connected to the platform. For example, the platform may include a plurality of ring members to which the second fasteners of the attachment members may be connected.

Still another aspect is a bird feeding system that may include a platform that is adjustably connected to a bird feeder using one or more attachment members. For example, the attachment members may include a cord and a latch member that is sized and configured to adjust the length of the cord. The latch member is preferably button-activated but other suitable latch portions, such as buckles and the like, may be used to adjust the length of the cord.

Another aspect is a bird feeding system that may include a platform that is quickly and easily connected to a bird feeder without using screws, bolts or similar mechanical fasteners. Advantageously, the platform may also be connected to the bird feeder without altering the bird feeder.

These and other aspects, features and advantages of the present invention will become more fully apparent from the following detailed description of preferred embodiments and appended claims.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limit its scope. The invention will be described and explained with additional specificity and detail through the use of the accompanying drawings in which.

DETAILED DESCRIPTION OF THE PREFERRED EMBODIMENTS

The present invention is generally directed towards bird feeding systems. The principles of the present invention, however, are not limited to bird feeding systems. It will be understood that, in light of the present disclosure, the bird feeding systems disclosed herein can be successfully used in connection with other types of animal feeding systems.

Additionally, the systems and structures disclosed herein do not have to be used to feed birds or other animals. In contrast, the system may also be used to provide birds or other animals a place to rest, stay and/or temporarily reside. Thus, the systems and structures disclosed herein may be used for one or more purposes such as feeding, resting and the like.

Further, to assist in the description of the bird feeding system, words such as top, bottom, front, rear, right and left may be used to describe the accompanying figures, which are not necessarily drawn to scale. It will be appreciated, however, that the bird feeding system can be located in a variety of desired positions—including various angles, sideways and even upside down. A detailed description of the bird feeding system now follows.

Figure 1:
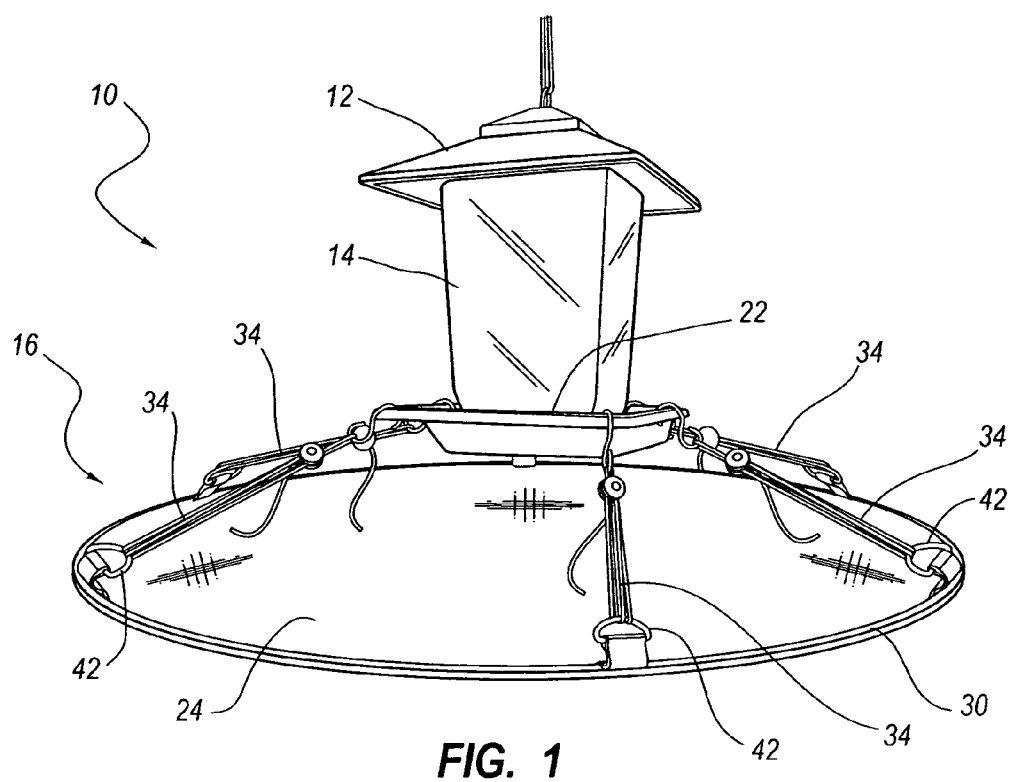
FIG. 1 is a perspective view of an exemplary bird feeding system, illustrating a platform connected to a bird feeder.

As shown in FIG. 1, a bird feeding system 10 may include a bird feeder 12. The bird feeder 12 preferably includes a container 14 into which bird feed may be added. The bird feed may comprise seeds, dried food, or any other food used to feed birds. It will be appreciated that the type of bird feed used may depend, for example, on the particular birds one intends to feed or attract. The bird feeding system 10 is preferably used outdoors and near one's residence to feed wild birds. However, the bird feeding system may be used indoors, may be used to feed and/or attract other types of birds, and may be used away from one's residence, such as when camping or when traveling in a recreational vehicle or "RV."

Figure 2:
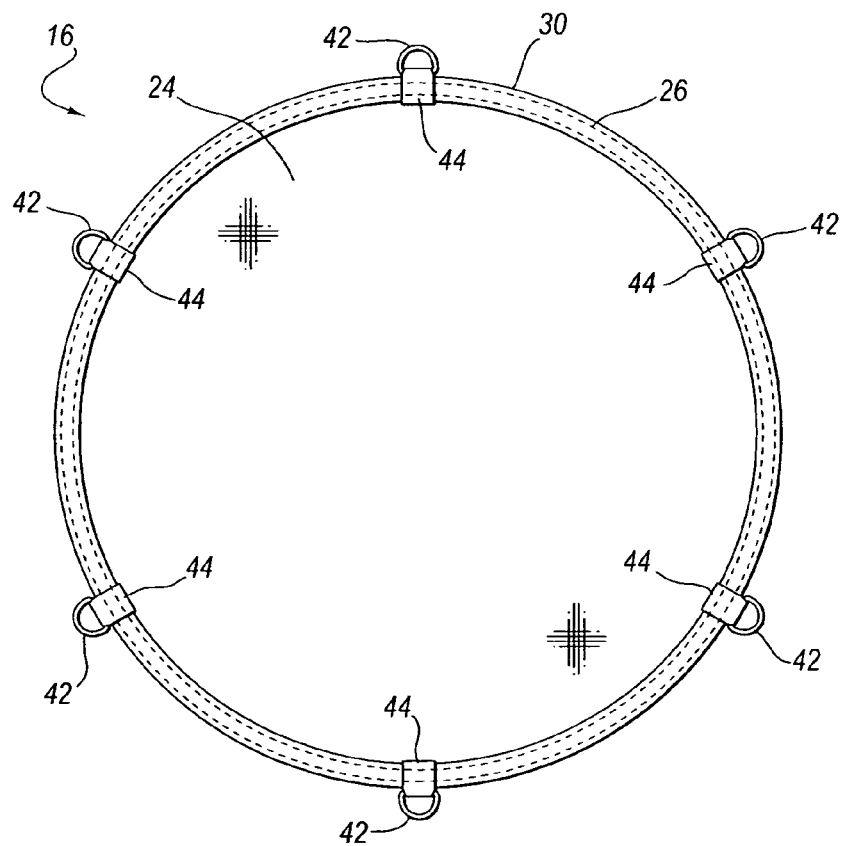
FIG. 2 is a top view of the platform shown in FIG. 1.

As shown in FIGS. 1-2, the bird feeding system 10 may include a bird feed catching device (such as, a platform 16) that is preferably sized and configured to catch at least a portion of the bird feed that may fall from the bird feeder. For example, at least a portion of the platform 16 is preferably disposed below the bird feeder. As birds intentionally cast bird feed from the bird feeder 12 and/or inadvertently drop bird feed from the bird feeder, the platform 16 advantageously catches at least a portion of that fallen bird feed. The platform 16 is preferably positioned in a generally horizontal orientation, and the platform preferably has a generally circular configuration having a diameter of about 1 foot to about 3 feet. However, the platform 16 may have larger or smaller dimensions, and may have a generally oval, square, octagonal, hexagonal, polygonal, rectangular, oblong, irregular or other suitable shape, depending, for example, upon the particular configuration of the bird feeder. Further, the platform 16 may be positioned in other suitable orientations, if desired. Also, any components of the bird feeding system 10, such as the platform 16 or the bird feeder 12, may have any suitable color.

The platform 16 is preferably sized and configured to feed the birds with bird feed that falls from the bird feeder 12. For example, as birds intentionally cast bird feed from the bird feeder 12 and/or inadvertently drop bird feed from the bird feeder, the platform 16 advantageously catches at least a portion of that fallen bird feed. Although ground feeding birds may find the bird feed undesirable when in the bird feeder 12, they may find the fallen bird feed more desirable when upon the platform 16.

Figure 3:
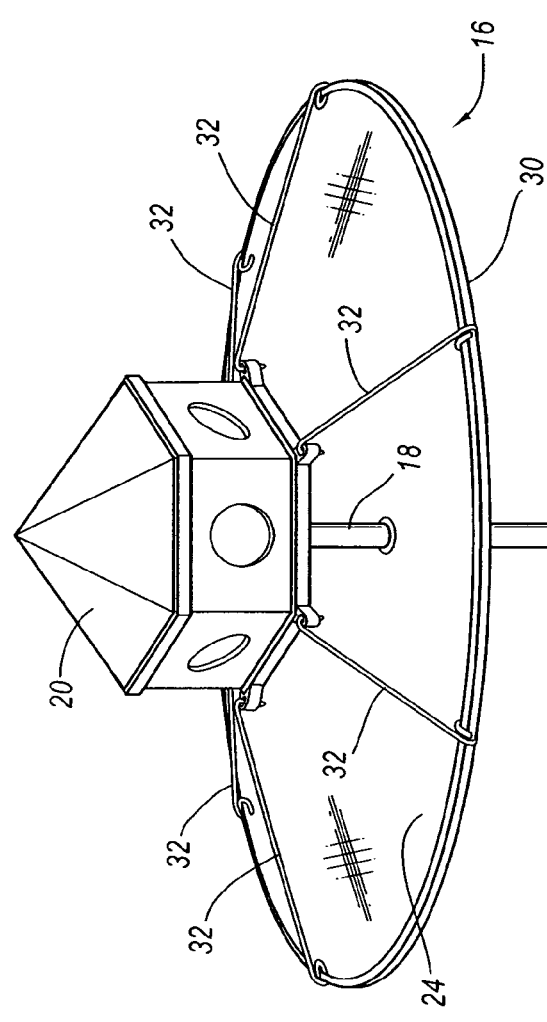
FIG. 3 is a perspective view of the platform shown in FIG. 1, illustrating the platform connected to another bird feeder.

The platform 16 is preferably sized and configured to catch at least a portion of the bird feed that may fall from a variety of bird feeders. For example, the platform 16 may be used with a hanging bird feeder, such as the bird feeder 12. Also, the platform 16 may include an opening, such as X-shaped cut, sized and configured to receive a support member 18 of a bird feeder 20, as shown in FIG. 3. It will be appreciated that the opening need not be X-shaped and may have any other suitable shape and/or configuration. The platform 16 may also be hung independent of any bird feeder to serve as a platform feeder without an additional feeder for perching birds.

As shown in FIG. 1, the bird feeder 12 may include a perch 22. Perch feeding birds may advantageously use the perch 22 to access the bird feed from the bird feeder. As the perch feeding birds inadvertently drop bird feed from the bird feeder 12 and as ground feeding birds cast the bird feed from the bird feeder, the platform 16 advantageously catches at least a portion of that fallen bird feed. Accordingly, the ground feeding birds may feed at the platform 16, while the perch feeding birds feed at the perch 22. Also, if desired, a person may retrieve the uneaten fallen bird seed from the platform 16 to refill the bird feeder 12 for the perch feeding birds.

As shown in FIGS. 1-3, the platform 16 may have a catching portion 24 sized and configured to catch at least a portion of the bird feed that may fall from a bird feeder. The catching portion 24 preferably has a permeable construction to allow water, rain, melted snow, and the like to pass through the catching portion. For example, the permeable catching portion 24 may be constructed from materials having a mesh construction, such as awning fabric mesh, window screens and the like. Advantageously, because the catching portion 24 may have a permeable construction, the catching portion preferably will not retain large amounts of rain, which could weigh upon and damage the platform. Further, if connected to a bird feeder, the catching portion 24 having a permeable construction will help prevent the rain from significantly weighing down and damaging the bird feeder. The catching portion 24 may be constructed from cloth, metal, polyester, vinyl, nylon, aluminum, or other natural or synthetic materials. It will be appreciated that the permeable construction does not require a mesh construction and could have other suitable permeable constructions, and the catching portion 24 does not require a mesh construction or a permeable construction, depending upon the particular configuration of the bird feeding system 10. It will also be appreciated that a person may choose to directly place bird feed upon the catching portion 24 of the platform if desired.

The catching portion 24 may be generally resistant to ultraviolet (UV) light. The generally UV resistant catching portion 24 may, for example, be constructed from a UV resistant material. The generally UV resistant catching portion 24 may have a UV protective product applied to at least a portion of the catching portion. It will be appreciated, however, that the catching portion 24 need not be generally UV resistant.

The platform 16 may be relatively lightweight. When connected to a bird feeder, the lightweight platform 16 may advantageously apply less stress upon the bird feeder, which may help avoid damage to the bird feeder. Further, when connected to a hanging bird feeder, the lightweight platform 16 may advantageously apply less stress upon the structure from which the bird feeder hangs. For example, some bird feeders hang from a tree limb, which may be more susceptible to additional weight.

As shown in FIG. 2, the platform 16 may include a frame 26. The frame 26 is preferably sized and configured to support at least a portion of the catching portion 24. The frame 26 preferably has a generally ring-like shape having a diameter of about 1 foot to about 3 feet, and the frame may be connected to the catching portion 24 to help support the catching portion. The catching portion 24 may be sewed upon the frame 26, but the catching portion may be connected to the frame in any other suitable fashion. The frame 26 may have a diameter of about 27 inches, about 35 inches, or larger or smaller diameters depending upon the particular configuration of the bird feeding system 10.

The frame 26 may be constructed from plastic, PVC, metal, steel, lightly tempered steel, wood, synthetic materials, natural materials or other suitable materials. Also, the frame 26 may have a generally circular, oval, square, octagonal, hexagonal, polygonal, rectangular, oblong, irregular or other suitable configuration. The frame 26 may have a generally hollow interior portion. For example, existing products such as a hoola hoop or flexible plumber tubing and plumbing joiners could be used to construct a frame if desired. However, the frame 26 need not be constructed from existing products and does not require a generally hollow interior portion. Further, the frame 26 may be constructed from relatively rigid materials, if desired.

Figure 4:
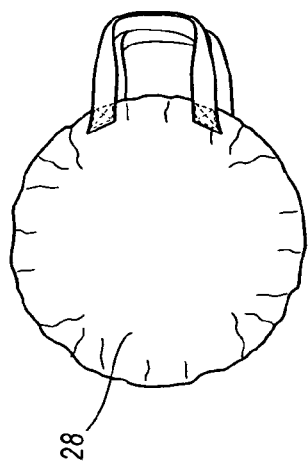
FIG. 4 is a top view of a case that is sized and configured to receive the platform shown in FIG. 1 in a collapsed position.

The platform 16 may be sized and configured to be moved between an expanded use position and a collapsed storage position. For example, the frame 26 is preferably constructed from a flexible, collapsible material, such as lightweight tempered steel. The frame 26 may be collapsed and expanded to permit the platform 16 to be moved between an expanded use position (such as shown in FIGS. 1-3) and a collapsed storage position shown in FIG. 4. When the platform 16 is in a collapsed position, the platform may be relatively compact, which may advantageously allow the platform 16 to be more efficiently shipped and/or stored. A storage case 28 may be provided to retain the platform 16 in the collapsed storage position and to store any other suitable portions of the bird feeding system 10.

The frame 26 and the platform 16 may be twist-folded to collapse the frame and the platform. To help twist-fold the frame 26 and the platform 16, the platform may include a sleeve 30 into which some or all of the frame may be inserted and retained. The twist-foldable frame 26 is preferably constructed from thin tempered steel wire, and the sleeve 30 is preferably constructed from a durable material, such as outdoor grade polyester material. The frame 26 and the platform 16 may be twist-folded to collapse to about 20 percent to about 30 percent of their expanded sizes. The frame 26 and the platform 16 preferably may be twist-folded to at least about 25 percent of their expanded sizes.

The platform 16 is preferably positioned at least a substantial portion above the ground. Advantageously, because the platform 16 is positioned at least a substantial portion above the ground, predators are less likely to be able to harm birds that feed from the platform 16 rather than from the ground. Further, because the platform 16 is positioned at least a substantial portion above the ground, persons may more easily view the birds that feed from the platform 16. The platform 16 is preferably positioned at least about 3 to about 5 feet from the ground, but the platform may be positioned higher or lower, if desired.

Figure 5:
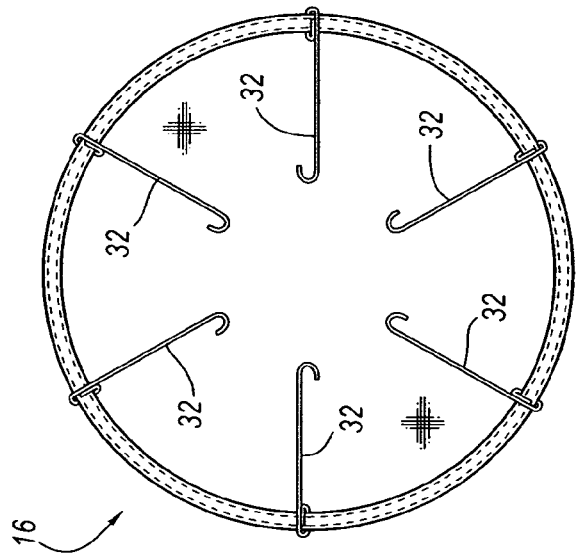
FIG. 5 is a top view of the platform shown in FIG. 1, illustrating exemplary attachment members.

The platform 16 may be connected to a bird feeder using one or more attachment members. For example, the platform 16 may be connected to the bird feeder 20 by a plurality of attachment members 32 constructed from a relatively rigid material. As shown in FIGS. 3 and 5, the plurality of relatively rigid attachment members 32 preferably are wires constructed from a generally rust resistant material. The relatively rigid attachment members 32 may include a first end connected to the frame 26 and a second end including a hook used to connect to a bird feeder. The first end of the attachment members 32 may be connected to the frame 26 by wrapping at least a portion of the attachment member around the frame or by other suitable means.

Figure 6:
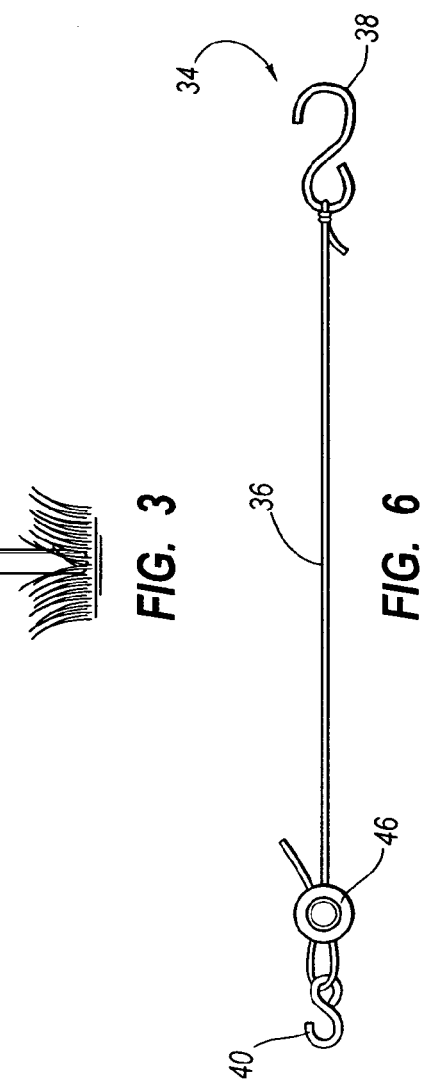
FIG. 6 is a side view of an exemplary attachment member.

As shown in FIGS. 1 and 6, the platform 16 may be quickly and easily connected to a variety of bird feeders using, for example, attachment members 34. The attachment members 34 preferably comprise a cord 36, a fastener 38, and a fastener 40. The cord 36 is preferably constructed of nylon or other suitable weather resistant materials. The fastener 38 preferably comprises a hook member constructed of metal and is sized and configured to be connected to a portion of a bird feeder. The fastener 40 preferably comprises a hook member constructed of plastic and is sized and configured to be connected to the platform 16. For example, the platform 16 may include a plurality of ring members 42 to which the fasteners 40 of the attachment members 34 may be connected. The ring members 42 may be connected to the frame 26 of the platform 16 using, for example, nylon webbing 44. The ring members 42 preferably have a generally D-shape configuration having about a 1 inch opening, but the ring members may have other suitable shapes and sizes. The ring members 42 may be spaced substantially equidistant along the frame 26 to provide a generally balanced platform, but the ring members may be arranged in other suitable configurations. The platform 16 preferably includes six ring members, which may be connected to the bird feeder by six attachment members; however, fewer or more ring members and/or attachment members may be used, if desired. Further, the cord 36 and the fasteners 38, 40 may be constructed of other suitable materials. Also, the fasteners 38, 40 may be hooks, generally S-shaped hooks, generally J-shaped hooks, snap fasteners, and other suitable fasteners preferably configured to selectively and/or releasably connect to a platform and/or a bird feeder.

The attachment members 34 may be sized and configured to adjustably connect the platform 16 to a bird feeder. For example, the attachment members 34 may include a latch member 46 sized and configured to adjust the operative length of the cord 36. The latch member 46 is preferably button-activated but other suitable latch portions, such as buckles and the like may be used to adjust the operative length of the cord 36.

The attachment members 32, 34 preferably have an operative length of up to about 18 inches, and the attachment members may help secure the platform 16 up to about 4 inches to about 8 inches below a bird feeder. The attachment members 32, 34 may help secure the platform 16 about 6 inches below a bird feeder. However, the attachment members 32, 34 may have a greater or lesser operative length and may secure the platform 16 at greater or lesser distances from a bird feeder, depending, for example, upon the particular size and configuration of the bird feeder. Also, the attachment members 32, 34 may have other suitable configurations suitable for connecting the platform 16 to a bird feeder, including but not limited to chains, cables, ropes, strings and the like. Further, it will be appreciated that the platform 16 need not be connected to the bird feeder and may be connected to other structures near the bird feeder.

Advantageously, the attachment members 32, 34 may be used to quickly and easily connect the platform 16 to a bird feeder without using screws, bolts or similar mechanical fasteners. The platform 16 may also be connected to a bird feeder without altering the bird feeder, if desired.

The platform 16 may also include a lip or rim that is sized and configured to help retain bird feed upon the catching portion 24. For example, the lip may extend upwardly from the catching portion 24 and the lip preferably has a height between about one and about three inches, but the lip could be larger or smaller. The lip is preferably generally aligned with an outer portion of the platform 16 and/or an outer portion of the catching portion 24, but the lip could also be spaced apart from the outer portion if desired. In particular, the lip may include a lower portion that is connected to the catching portion 24, the frame 26 and/or the sleeve 30, and an upper portion that is connected to the attachment members 34, ring members 42 and/or the webbing 44. In greater detail, the upper portion of the lip may be connected to a support member, such as a ring or frame, which is connected to the attachment members 34, ring members 42 and/or the webbing 44.

It will be appreciated that the lip may have other suitable configurations and arrangements. For example, the upper portion of the lip may include a sleeve (which may be similar to the sleeve 30) that is sized and configured to receive a frame (which may be similar to the frame 26). The sleeve and/or frame may then be connected to the attachment members 34, ring members 42 and/or the webbing 44 to support the upper portion of the lip. The lower portion of the lip may be connected to the catching portion 24, the frame 26 and/or the sleeve 30. If the lip is connected to the webbings 44, for example, the lip may have about the same length as the webbing. It will be appreciated that the lip may be connected to any suitable portions of the bird feeding system 10 and the lip may have other shapes, sizes, configurations and arrangements depending, for example, upon the shape, size, configuration and arrangement of the bird feeding system.

The lip is preferably sized and configured to allow the platform to be collapsed. Accordingly, the lip is preferably constructed from a relatively flexible material, such as the material used to construct the catching portion 24. The lip may also be constructed from a relatively wind-resistant material, which may help contain the bird feed within the catching portion 24. The lip and/or catching portion 24 may also be constructed from materials that allow the bird feed to be seen within the catching portion, if desired.

Field test results demonstrated that the platforms described above helped to catch up to about 90 to 95 percent of the bird feed that fell from a tested bird feeder. Consequently, because much of the uneaten bird feed could be reused, the bird feed tended to last about 4 times as long—thus reducing the bird feed costs by about 75%. Further, in these tests, no significant amount of bird feed accumulated on the ground, no significant amounts of vermin were attracted and no significant damage was caused to the grass disposed underneath the bird feeder.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A bird feed catching device that is sized and configured to be connected to a bird feeder, the bird feeder including a container for holding bird feed and an area that is sized and configured to allow birds to eat the bird feed from the bird feeder, the bird feed catching device being independent from and selectively attached to the bird feeder, the bird feed catching device comprising:
   a catching portion that is sized and configured to catch bird feed that falls from the bird feeder before the bird feed strikes the ground, the catching portion being disposed below and spaced apart from the bird feeder by a distance that allows birds to feed from the catching portion, the entire catching portion being generally disposed in a horizontal plane;
   a flexible and collapsible metal frame that is constructed from wire and is sized and configured to support the catching portion, the frame being generally disposed in the same horizontal plane as the catching portion;
   one or more attachment members that are sized and configured to attach the bird feed catching device to the bird feeder, the attachment members being sized and configured to allow the catching portion to be spaced apart from the bird feeder;
   wherein a first group of one or more birds may eat bird feed from the bird feeder while a second group of one or more birds may eat bird feed from the catching portion when the bird feed catching device is attached to a bird feeder.

2. The bird feed catching device as in claim 1, wherein the plane including the catching portion and the frame is spaced apart from the bird feeder by a distance between about four inches and about eight inches.

3. The bird feed catching device as in claim 1, wherein the catching portion is constructed from a permeable material.

4. The bird feed catching device as in claim 1, wherein the frame is movable between an expanded position and a collapsed position, the collapsed position having about twenty-five percent (25%) or less of its size in the expended position.

5. The bird feed catching device as in claim 1, wherein the attachment members have an adjustable length.

6. The bird feed catching device as in claim 1, further comprising a bird feeder;
   wherein perch feeding birds may eat the bird feed from the bird feeder; and
   wherein ground feeding birds may eat bird feed on the platform.

7. The bird feed catching device as in claim 1, wherein the bird feed catching device further comprises a sleeve sized and configured to receive at least a portion of the frame, the sleeve connecting the catching portion and the frame; and
   wherein the sleeve, the catching portion and the frame are disposed in the same plane when the frame is in the expanded position.

8. The bird feed catching device as in claim 1, wherein the catching portion is sized and configured to catch at least about ninety percent of the bird feed that falls from the bird feeder and birds can eat the fallen bird feed directly from the catching portion.

9. A bird feeding system including a bird feeder and a bird feed catching device that is sized and configured to be connected to a bird feeder, the bird feeder including a container for holding bird feed and an area that is sized and configured to allow birds to eat the bird feed from the bird feeder, the bird feed catching device being independent from and selectively attached to the bird feeder, the bird feeding system comprising:
   a catching portion that is sized and configured to catch bird feed from the bird feeder before the bird feed strikes the ground, the catching portion being sized and configured to be disposed below and spaced apart from the bird feeder by a distance to allow birds to feed from the catching portion;
   a frame supporting the catching portion, the frame movable between an expanded position and a collapsed position, the frame capable of repeatedly moving between the expanded position and the collapsed position by twist-folding, the frame and the catching portion having a generally planar horizontal configuration and generally disposed in the same horizontal plane when the frame is in the expanded position; and
   one or more attachment members sized and configured to attach the bird feed catching device to the bird feeder, the attachment members being sized and configured to allow the catching portion to be spaced apart from the bird feeder;
   wherein a first group of one or more birds may eat bird feed from the bird feeder while a second group of one or more birds may eat bird feed from the catching portion when the bird feed catching device is attached to a bird feeder.

10. The bird feeding system as in claim 9, wherein the frame has a ring-like shape with a generally circular configuration, the catching portion being at least substantially disposed within the frame.

11. The bird feeding system as in claim 9, wherein the catching portion is constructed from a permeable material.

12. The bird feeding system as in claim 9, wherein the frame has about twenty-five percent (25%) or less of its size in the collapsed position than in the expended position.

13. The bird feeding system as in claim 9, wherein the attachment members have an adjustable length.

14. The bird feeding system as in claim 9, wherein the bird feed catching device further comprises a sleeve sized and configured to receive at least a portion of the frame.

15. The bird feeding system as in claim 9, wherein the plane including the catching portion and the frame is spaced apart from the bird feeder by a distance between about four inches and about eight inches.

16. A bird feed catching device that is sized and configured to be connected to a bird feeder, the bird feeder including a container for holding bird feed and an area that is sized and configured to allow birds to eat the bird feed from the bird feeder, the bird feed catching device being independent from and selectively attached to the bird feeder, the bird feed catching device comprising:

a catching portion that is sized and configured to catch bird feed from the bird feeder before the bird feed strikes the ground, the catching portion being sized and configured to be disposed below and spaced apart from the bird feeder by a distance between about four inches and about eight inches to allow birds to eat the bird seed on the catching portion;

a frame that supports the catching portion, the frame movable between an expanded position and a collapsed position, the frame being capable of repeatedly nondestructively moving between the expanded position and the collapsed position by twist-folding, the frame having about twenty-five percent (25%) or less of its size in the collapsed position than in the expended position; and one or more attachment members that are sized and configured to attach the bird feed catching device to the bird feeder, the attachment members being sized and configured to allow the catching portion to be spaced apart from the bird feeder;

wherein a first group of one or more birds may eat bird feed from the bird feeder while a second group of one or more birds may eat bird feed from the catching portion when the bird feed catching device is attached to a bird feeder.

17. The bird feed catching device as in claim 16, wherein the frame and the catching portion are both generally disposed in the same plane, the plane being spaced apart from the bird feeder by the distance between about four inches and about eight inches.

18. The bird feed catching device as in claim 16, wherein the catching portion is constructed from a permeable material.

19. The bird feed catching device as in claim 16, wherein the catching portion includes an opening that is sized and configured to receive a support for the bird feeder.

20. The bird feed catching device as in claim 19, wherein the attachment members have an adjustable length.

21. The bird feed catching device as in claim 16, further comprising a bird feeder.

22. The bird feed catching device as in claim 16, wherein the platform further comprises a sleeve sized and configured to receive at least a portion of the frame.

23. The bird feed catching device as in claim 16, wherein the catching portion is generally UV resistant.

* * * * *

UNITED STATES PATENT AND TRADEMARK OFFICE
CERTIFICATE OF CORRECTION

PATENT NO. : 7,669,553 B2
APPLICATION NO. : 11/374537
DATED : March 2, 2010
INVENTOR(S) : White et al.

It is certified that error appears in the above-identified patent and that said Letters Patent is hereby corrected as shown below:

Column 1
Line 6, change "This applications claims" to --This application claims--

Column 5
Lines 48-49, change "such as X-shaped cut" to --such as an X-shaped cut--

Column 8
Line 16, change "to be adjustably connect" to --to adjustably connect--

Column 10
Line 4, change "the expended position" to --the expanded position--

Column 10
Line 65, change "the expended position" to --the expanded position--

Signed and Sealed this

Twentieth Day of July, 2010

David J. Kappos
*Director of the United States Patent and Trademark Office*